United States Patent
Rémy et al.

(10) Patent No.: US 11,630,016 B2
(45) Date of Patent: Apr. 18, 2023

(54) PRESSURE MEASUREMENT SYSTEM AND METHOD FOR OPERATING SAME

(71) Applicant: Pratt & Whitney Canada Corp., Longueuil (CA)

(72) Inventors: Patrice Rémy, St-Hubert (CA); Frédéric Doucet, Longueuil (CA); Christian Bissonnette, Gatineau (CA); Luc Archambault, Saint-Jean-sur-Richelieu (CA)

(73) Assignee: Pratt & Whitney Canada Corp., Longueuil (CA)

( * ) Notice: Subject to any disclaimer, the term of this patent is extended or adjusted under 35 U.S.C. 154(b) by 56 days.

(21) Appl. No.: 17/407,580

(22) Filed: Aug. 20, 2021

(65) Prior Publication Data

US 2023/0054983 A1 Feb. 23, 2023

(51) Int. Cl.
| | |
|---|---|
| *G01P 5/16* | (2006.01) |
| *G01L 19/04* | (2006.01) |
| *G01M 15/14* | (2006.01) |
| *G01K 13/024* | (2021.01) |
| *G01L 11/00* | (2006.01) |

(52) U.S. Cl.
CPC ............ *G01L 19/04* (2013.01); *G01K 13/024* (2021.01); *G01L 11/00* (2013.01); *G01M 15/14* (2013.01); *G01P 5/16* (2013.01); *G01K 2205/02* (2013.01)

(58) Field of Classification Search
CPC . G01P 5/16; G01P 5/165; G01L 11/00; G01L 19/04; G01M 15/14; G01K 13/024; G01K 2205/02

See application file for complete search history.

(56) References Cited

U.S. PATENT DOCUMENTS

| | | | | |
|---|---|---|---|---|
| 2,706,408 | A * | 4/1955 | Holbrook | G01F 1/46 |
| | | | | 73/861.68 |
| 3,512,414 | A | 5/1970 | Rees | |
| 7,328,623 | B2 | 2/2008 | Slagle | |
| 9,097,735 | B2 * | 8/2015 | Martin | G01P 5/165 |

(Continued)

FOREIGN PATENT DOCUMENTS

| | | | | |
|---|---|---|---|---|
| AT | | 524542 A4 * | 7/2022 | ............. G01P 5/165 |
| GB | | 2318961 B | 8/2000 | |

OTHER PUBLICATIONS

Pitot Tube—Wikipedia (Year: 2022).*
EP search report for EP22191325.4 dated Oct. 24, 2022.

*Primary Examiner* — Nguyen Q. Ha
(74) *Attorney, Agent, or Firm* — Getz Balich LLC

(57) ABSTRACT

A measurement system for an aircraft gas turbine engine includes a probe and a heated-gas source in fluid communication with the pressure probe. The probe includes a probe body defining an internal cavity of the probe. The probe further includes a plurality of sensor inlet ports extending through the probe body and configured to receive a sensed fluid flow. The probe further includes a plurality of probe conduits. Each probe conduit of the plurality of probe conduits is coupled to a respective sensor inlet port of the plurality of sensor inlet ports and extending from the respective sensor inlet port to an exterior of the probe body. The heated-gas source is configured to supply a heated gas flow to one or both of: the plurality of sensor inlet ports via the plurality of probe conduits and an interior of the probe body outside of the plurality of probe conduits.

20 Claims, 8 Drawing Sheets

(56) References Cited

U.S. PATENT DOCUMENTS

| | | |
|---|---|---|
| 10,337,931 B2 | 7/2019 | Anderson |
| 10,436,649 B2 | 10/2019 | Anderson |
| 10,670,473 B2 | 6/2020 | Costello |
| 2004/0031878 A1* | 2/2004 | Linton ................... B64D 33/02 244/10 |
| 2017/0175628 A1 | 6/2017 | Subramanian |
| 2019/0023406 A1 | 1/2019 | Scothern |

\* cited by examiner

PRESSURE MEASUREMENT SYSTEM AND METHOD FOR OPERATING SAME

BACKGROUND

1. Technical Field

This disclosure relates generally to instrumentation systems for aircraft gas turbine engines and more particularly to fluid measurement systems resistant to icing and fluid ingestion.

2. Background Information

In various conditions, such as during testing and development, aircraft gas turbine engines may require measurement of operational parameters such as pressures and temperatures of fluids within engine flow paths (e.g., a core flow path). Accordingly, sensors such as pressure and temperature "rakes" may be installed within the fluid flow paths to measure the desired fluid parameters. However, during some operational conditions, the sensors may experience icing or ingestion of undesirable fluids (e.g., oil) which may inhibit the accurate measurement of fluid parameters. To prevent icing and fluid ingestion on similar types of sensor equipment, conductive or inductive heating systems along with physical shielding have been used. However, the introduction of electrical conductive/inductive heating systems adds additional complexity to sensor systems and requires the routing of electrical wiring through extensive portions of the gas turbine engine. Additionally, the electrical wiring may require shielding to prevent degradation by extreme conditions (e.g., high temperatures) within the gas turbine engine. Furthermore, physical shielding may not be sufficiently effective at preventing fluid ingestion by sensors. Accordingly, there is a need for improved sensor systems which address one or more of the above-noted concerns.

SUMMARY

It should be understood that any or all of the features or embodiments described herein can be used or combined in any combination with each and every other feature or embodiment described herein unless expressly noted otherwise.

According to an aspect of the present disclosure a measurement system for an aircraft gas turbine engine includes a probe and a heated-gas source in fluid communication with the probe. The probe includes a probe body extending lengthwise along a probe axis. The probe body defines an internal cavity of the probe. The probe further includes a plurality of sensor inlet ports extending through the probe body and configured to receive a sensed fluid flow. The plurality of sensor inlet ports is axially spaced along the probe axis. The probe further includes a plurality of probe conduits. Each probe conduit of the plurality of probe conduits is coupled to a respective sensor inlet port of the plurality of sensor inlet ports and extends from the respective sensor inlet port to an exterior of the probe body. The heated-gas source is configured to supply a heated gas flow to one or both of: the plurality of sensor inlet ports via the plurality of probe conduits and an interior of the probe body outside of the plurality of probe conduits.

In any of the aspects or embodiments described above and herein, each sensor inlet port of the plurality of sensor inlet ports faces a common fluid flow direction.

In any of the aspects or embodiments described above and herein, the measurement system further includes sensor instrumentation in fluid communication with the plurality of sensor inlet ports via the plurality of probe conduits. The sensor instrumentation is configured to receive the sensed fluid flow and calculate one or more sensed fluid flow measurements.

In any of the aspects or embodiments described above and herein, the measurement system further includes at least one first valve in fluid communication with the plurality of probe conduits. The at least one first valve is operable between a sensing valve position and a heating valve position, wherein: the at least one first valve is configured to allow passage of the sensed fluid flow from the plurality of sensor inlet ports to the sensor instrumentation in the sensing valve position and the at least one first valve is configured to allow passage of the heated gas flow from the heated-gas source to the plurality of sensor inlet ports in the heating valve position.

In any of the aspects or embodiments described above and herein, the probe includes at least one heated-gas channel located in the interior of the probe body and in fluid communication with the heated-gas source.

In any of the aspects or embodiments described above and herein, the at least one heated-gas channel is located within the internal cavity of the probe.

In any of the aspects or embodiments described above and herein, the probe body includes at least one perforation extending through the probe body from the internal cavity to the exterior of the probe body.

In any of the aspects or embodiments described above and herein, the at least one heated-gas channel is located within and defined by the probe body.

In any of the aspects or embodiments described above and herein, the probe includes at least one heated-gas channel located in the interior of the probe body and in fluid communication with the heated-gas source via at least one second valve and independent of the at least one first valve.

In any of the aspects or embodiments described above and herein, the measurement system further includes a controller configured to control the heated gas flow from the heated-gas source to the probe.

In any of the aspects or embodiments described above and herein, the controller is configured to regulate the heated gas flow to the probe, cased on one or both of a measured pressure and a measured temperature of the sensed fluid flow, to achieve a target temperature of the probe.

In any of the aspects or embodiments described above and herein, each sensor inlet port of the plurality of sensor inlet ports includes a Kiel probe or a Pitot probe.

According to another aspect of the present disclosure, a gas turbine engine for an aircraft includes a probe located within a fluid flow path of the gas turbine engine and a heated-gas source in fluid communication with the probe. The probe includes a probe body extending lengthwise along a probe axis. The probe body defines an internal cavity of the probe. The probe further includes a plurality of sensor inlet ports extending through the probe body and configured to receive a sensed fluid flow. The plurality of sensor inlet ports is axially spaced along the probe axis. The probe further includes a plurality of probe conduits. Each probe conduit of the plurality of probe conduits is coupled to a respective sensor inlet port of the plurality of sensor inlet ports and extends from the respective sensor inlet port to an exterior of the probe body. The heated-gas source is configured to supply a heated gas flow to one or both of: the plurality of sensor inlet ports via the plurality of probe conduits and an interior of the probe body outside of the plurality of probe conduits.

In any of the aspects or embodiments described above and herein, the gas turbine engine further includes a duct defining the fluid flow path. The probe is mounted to the duct within the fluid flow path.

In any of the aspects or embodiments described above and herein, the gas turbine engine further includes a compressor. The compressor defines the heated-gas source and supplies compressor bleed gas to the probe as the heated gas flow.

According to another aspect of the present disclosure, a method for operating a measurement system for an aircraft gas turbine engine includes receiving a sensed fluid flow with a plurality of sensor inlet ports extending through a probe body of a probe. The probe body defines an internal cavity of the probe. The method further includes supplying a heated gas flow, with a heated-gas source in fluid communication with the probe, to one or both of: the plurality of sensor inlet ports via a plurality of probe conduits and an interior of the probe body outside of the plurality of probe conduits. Each probe conduit of the plurality of probe conduits is coupled to a respective sensor inlet port of the plurality of sensor inlet ports and extends from the respective sensor inlet port to an exterior of the probe body.

In any of the aspects or embodiments described above and herein, the step of receiving the sensed fluid flow with the plurality of sensor inlet ports includes receiving the sensed fluid flow with sensor instrumentation in fluid communication with the plurality of sensor inlet ports via the plurality of probe conduits and calculating one or more sensed fluid flow measurements with the sensor instrumentation.

In any of the aspects or embodiments described above and herein, the method further includes operating at least one valve in fluid communication with the plurality of probe conduits between a sensing valve position and a heating valve position, operating the at least one valve including: positioning the at least one valve in the sensing valve position during the step of receiving the sensed fluid flow with the plurality of sensor inlet ports to allow passage of the sensed fluid flow from the plurality of sensor inlet ports to the sensor instrumentation and positioning the at least one valve in the heating valve position during the step of supplying the heated gas flow to allow passage of the heated gas flow from the heated-gas source to the plurality of sensor inlet ports.

In any of the aspects or embodiments described above and herein, the step of supplying the heated gas flow includes supplying the heated gas flow to at least one heated-gas channel located in the interior of the probe body with the heated-gas source.

In any of the aspects or embodiments described above and herein, the method further includes regulating the heated gas flow to the probe, based on one or both of a measured pressure and a measured temperature of the sensed fluid flow, to achieve a target temperature of the probe.

The present disclosure, and all its aspects, embodiments and advantages associated therewith will become more readily apparent in view of the detailed description provided below, including the accompanying drawings.

DETAILED DESCRIPTION

Figure 1:
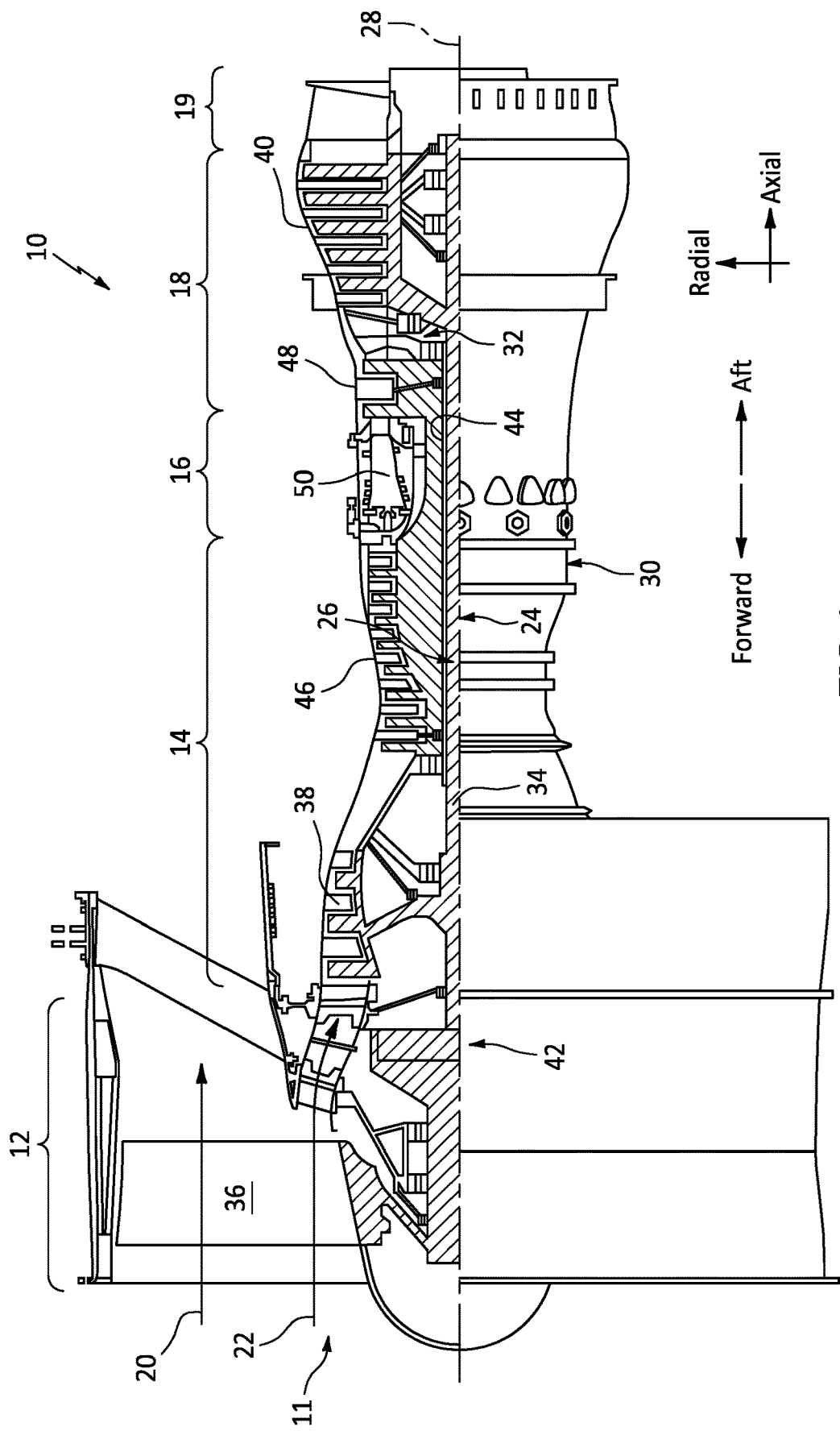
FIG. 1 illustrates a side cutaway view of a gas turbine engine, in accordance with one or more embodiments of the present disclosure.

Referring to FIG. 1, an exemplary gas turbine engine 10 is schematically illustrated. The gas turbine engine 10 is disclosed herein as a two-spool turbofan engine that generally includes an inlet 11, a fan section 12, a compressor section 14, a combustor section 16, a turbine section 18, and an exhaust section 19. The fan section 12 drives air along a bypass flow path 20 while the compressor section 14 drives air along a core flow path 22 for compression and communication into the combustor section 16 and then expansion through the turbine section 18. Although depicted as a turbofan gas turbine engine in the disclosed non-limiting embodiments, it should be understood that the concepts described herein are not limited to use with turbofans or even to gas turbine engines, as the teachings may be applied to other types of turbine engines or to other types of aircraft engines such as rotary engines. Additionally, it is further contemplated that aspects of the present disclosure may be applied to other engines (e.g., gas turbine engines) or industrial equipment which are not associated with aircraft or with the aerospace field, in general.

The gas turbine engine 10 generally includes a low-pressure spool 24 and a high-pressure spool 26 mounted for rotation about a longitudinal centerline 28 of the gas turbine engine 10 relative to an engine static structure 30 via one or more bearing systems 32. It should be understood that various bearing systems 32 at various locations may alternatively or additionally be provided.

The low-pressure spool 24 generally includes a first shaft 34 that interconnects a fan 36, a low-pressure compressor 38, and a low-pressure turbine 40. The first shaft 34 is connected to the fan 36 through a gear assembly of a fan drive gear system 42 to drive the fan 36 at a lower speed than the low-pressure spool 24. The high-pressure spool 26 generally includes a second shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. An annular combustor 50 is disposed between the high-pressure compressor 46 and the high-pressure turbine 48 along the longitudinal centerline 28. The first shaft 34 and the second shaft 44 are concentric and rotate via the one or more bearing systems 32 about the longitudinal centerline 28 which is collinear with respective longitudinal centerlines of the first and second shafts 34, 44.

Airflow along the core flow path 22 is compressed by the low-pressure compressor 38, then the high-pressure compressor 46, mixed and burned with fuel in the combustor 50, and then expanded over the high-pressure turbine 48 and the low-pressure turbine 40. The low-pressure turbine 40 and the high-pressure turbine 48 rotationally drive the low-pressure spool 24 and the high-pressure spool 26, respectively, in response to the expansion.

During gas turbine engine operation, development, testing, and/or certification, it may be necessary to measure fluid flow parameters, such as pressure or temperature, inside one or more fluid (e.g., air or other gas) flow paths of the gas turbine engine. Fluid flow parameters may be measured at various stages of a gas turbine engine such as the gas turbine engine 10. For example, fluid flow parameters may be measured in portions of the gas turbine engine 10 such as, but not limited to, the inlet 11, the compressor section 14 including various stages of the compressors 38, 46, the exhaust section 19, and other portions of the gas turbine engine 10 along the core flow path 22 or the bypass flow path 20.

Figure 2:
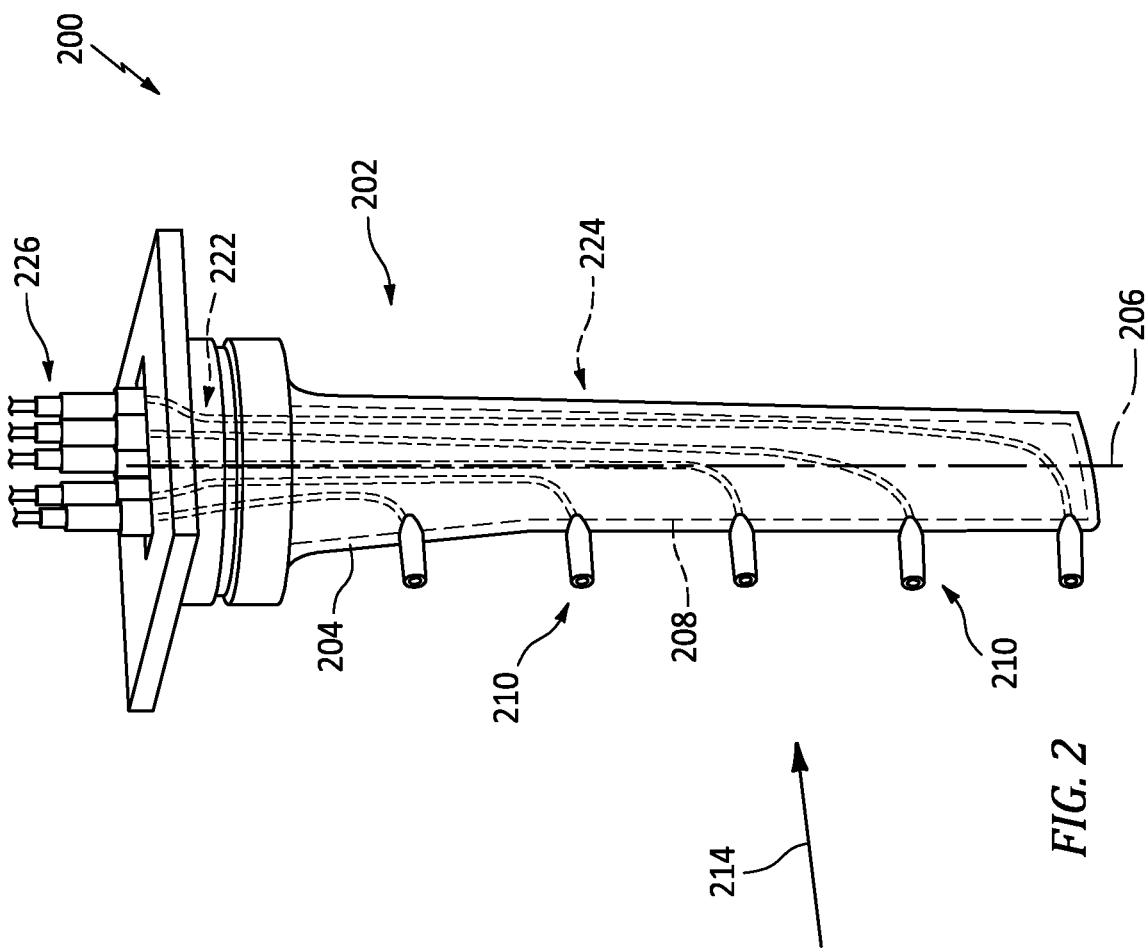
FIG. 2 illustrates perspective view of a pressure probe, in accordance with one or more embodiments of the present disclosure.
Figure 3:
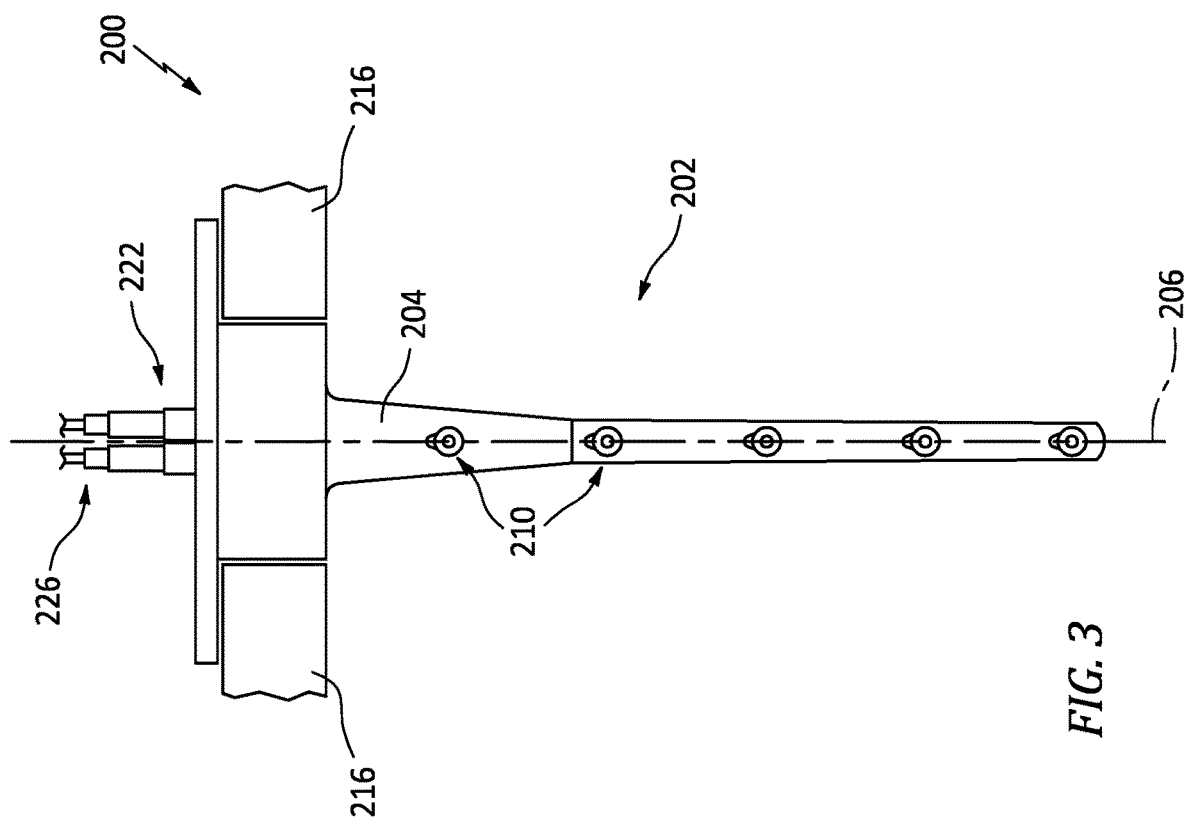
FIG. 3 illustrates a front view of the pressure probe of FIG. 2, in accordance with one or more embodiments of the present disclosure.
Figure 4:
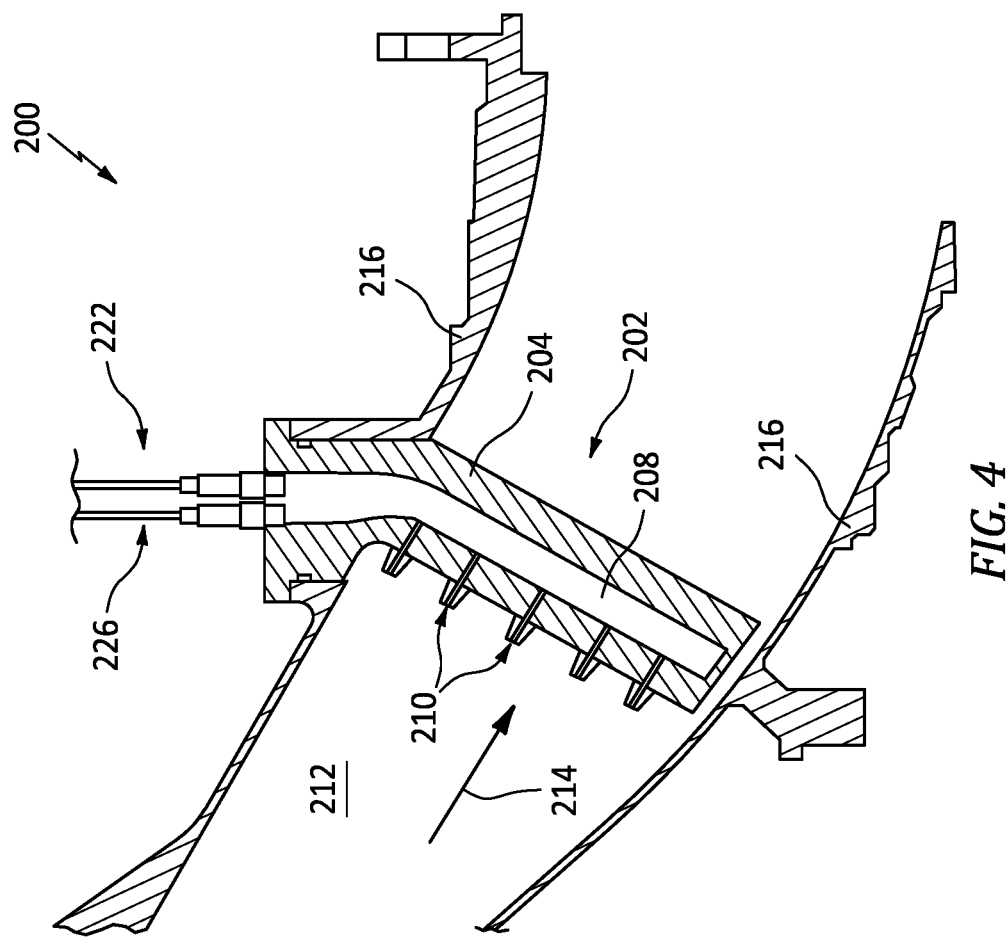
FIG. 4 illustrates a side cross-sectional view of a pressure probe positioned within a duct of a gas turbine engine, in accordance with one or more embodiments of the present disclosure.

Referring to FIGS. 2-4, gas turbine engine 10 may include at least one pressure measurement system 200 configured to measure the fluid flow parameters at a respective at least one fluid flow path location of the gas turbine engine 10. In some embodiments, the pressure measurement system 200 includes a pressure probe 202 configured to be disposed in a fluid flow path 212 of the gas turbine engine 10 to sample fluid (e.g., sensed fluid flow) within the fluid flow path 212. Alternatively, in some other embodiments, the pressure probe 202 may be positioned external to the gas turbine engine 10, for example, to measure fluid flow parameters of ambient air outside of the gas turbine engine 10 and/or along a body or wings of an aircraft and/or to measure fluid flow parameters in aircraft systems not associated with the gas turbine engine 10 such as, for example, within air ducts of an aircraft HVAC system. The pressure probe 202 includes a probe body 204 extending lengthwise along a probe axis 206. The probe body 204 defines an internal cavity 208 of the pressure probe 202. The pressure probe 202 may be used to measure a total pressure (sometimes referred to as "stagnation pressure" or "pitot pressure") of the fluid within the fluid flow path 212. Constituents of total pressure, such as the static pressure and the dynamic pressure (also known as "velocity pressure") of the fluid, may additionally be determined using the pressure probe 202. For ease of description the system 200 and probe 202 will be referred to as the "pressure measurement system" 200 and the "pressure probe" 202, respectively. However, it should be understood that the pressure measurement system 200 and pressure probe 202 may be used to additionally or alternatively measure fluid flow parameters other than pressure such as, but not limited to fluid flow swirl, fluid temperature, and fluid flow velocity.

The pressure probe 202 includes a plurality of sensor inlet ports 210 extending through the probe body 204 and may be configured as a "rake" with the plurality of sensor inlet ports 210 axially spaced along the probe axis 206. In various embodiments, the plurality of sensor inlet ports 210 may be substantially aligned with a fluid flow direction 214 of the fluid traversing the fluid flow path 212. In other words, each sensor inlet port of the plurality of sensor inlet ports 210 may face a common fluid flow direction (e.g., the fluid flow direction 214). In various other embodiments, the sensor inlet ports of the plurality of sensor inlet ports 210 may face different directions from one another depending, for example, on the expected fluid flow direction 214 of the fluid traversing the fluid flow path 212. For example, where the fluid experiences voracity or rotation along the fluid flow path 212, such that the fluid flow direction 214 varies, the plurality of sensor inlet ports 210 may be configured to face different directions to accommodate the varying fluid flow direction 214. In various embodiments, the sensor inlet ports of the plurality of sensor inlet ports 210 may be configured as Pitot probes (also known as a "Pitot tubes"). The sensor inlet ports may be configured as Kiel probes, which are a variation of the Pitot probes having an inlet protected by a "shroud," thereby making the Kiel probe configuration less sensitive to changes in yaw angle. Accordingly, the Kiel probe configuration may be more useful when the sensor inlet port alignment with the fluid flow direction 214 is variable or imprecise, for example, in comparison to conventional Pitot probe configurations. However, the present disclosure is not limited to any particular configuration of the plurality of sensor inlet ports 210.

As previous discussed, fluid flow parameters may be measured at various stages of a gas turbine engine such as the gas turbine engine 10. For example, fluid flow parameters may be measured in portions of the gas turbine engine 10 such as, but not limited to, the inlet 11, the compressor section 14 including various stages of the compressors 38, 46, the exhaust section 19, other portions of the gas turbine engine 10 along the core flow path 22 or the bypass flow path 20, etc. Accordingly, pressure probes, such as the pressure probe 202, may be located to measure fluid flow parameters at one or more locations within the gas turbine engine 10, such as the previously discussed exemplary locations. The present disclose, however, is not limited to any particular location of the pressure probe 202 within a gas turbine engine, and the pressure probe 202 may be located at any position within a gas turbine engine to measure fluid flow parameters associated with a fluid flow along a fluid flow path, such as the fluid flow path 212. As shown in FIGS. 3 and 4, in various embodiments, the pressure probe 202 may be mounted to a duct 216 (e.g., a duct defining a portion of the bypass flow path 20) or other mounting structure of the gas turbine engine 10 which defines all or a portion of the fluid flow path 212. The pressure probe 202 may, therefore, extend outward from the duct 216 and into the fluid flow path 212 such that the plurality of sensor inlet ports 210 are configured to be located within and facing the fluid traversing the fluid flow path 212 in the fluid flow direction 214. The pressure probe 202 is illustrated in FIG. 4 as extending radially inward from a mounting position on the duct 216, however, the present disclosure is not limited to any particular orientation of the pressure probe 202 within the fluid flow path 212 or with respect to the duct 216 or other mounting structure.

Figure 5:
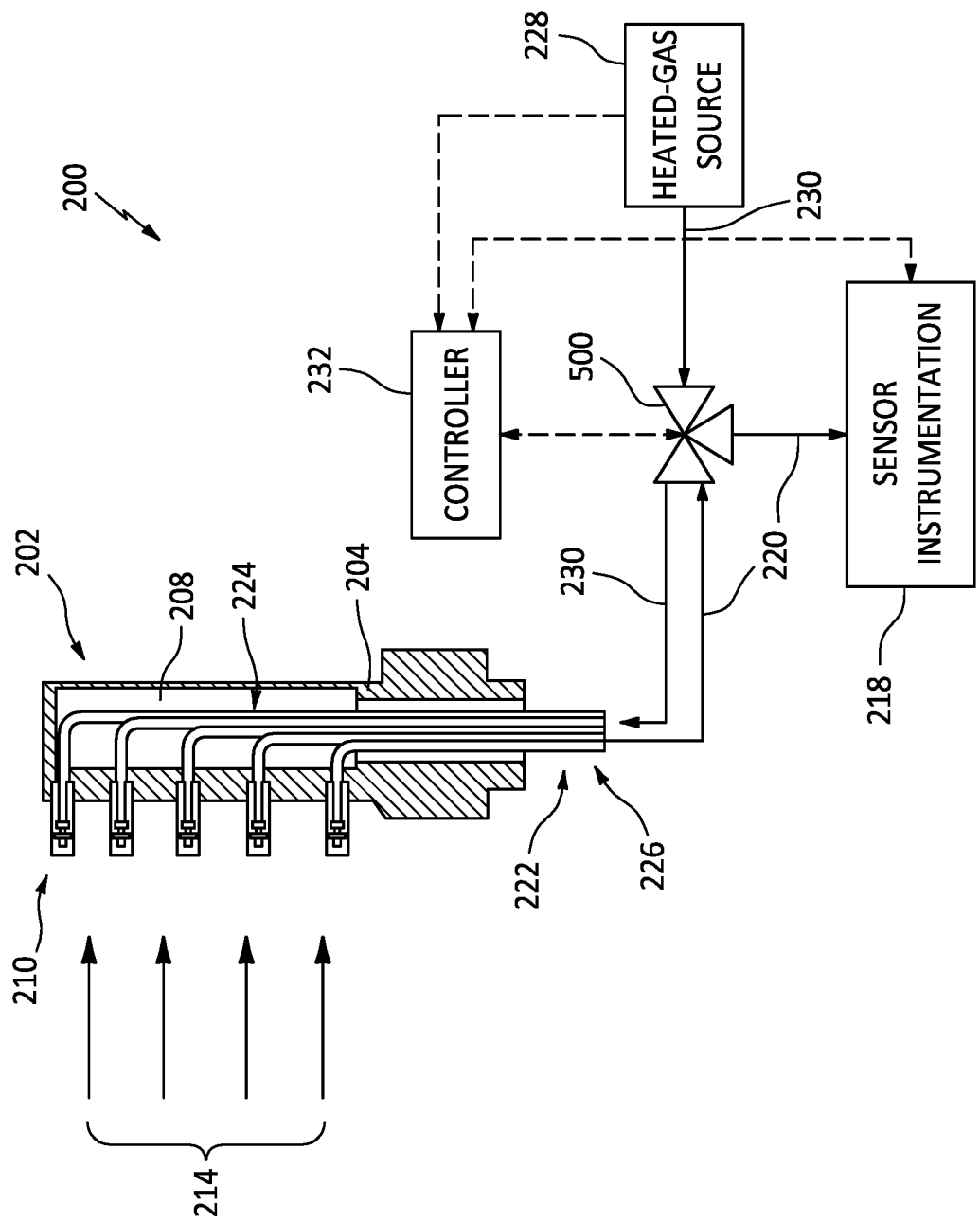
FIG. 5 illustrates a schematic view of a pressure measurement system including a pressure probe, in accordance with one or more embodiments of the present disclosure.
Figure 6:
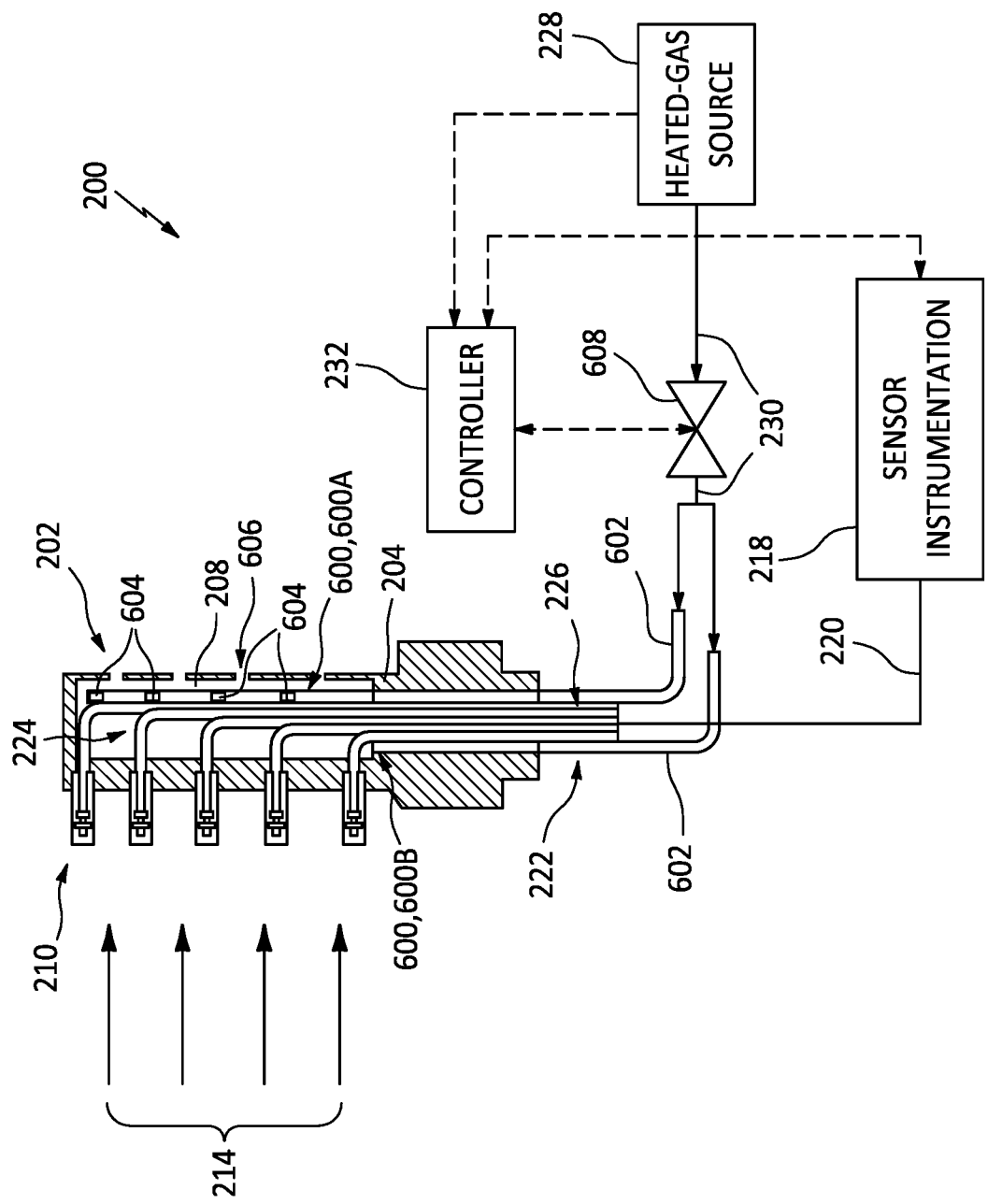
FIG. 6 illustrates a schematic view of another pressure measurement system including a pressure probe, in accordance with one or more embodiments of the present disclosure.
Figure 8:
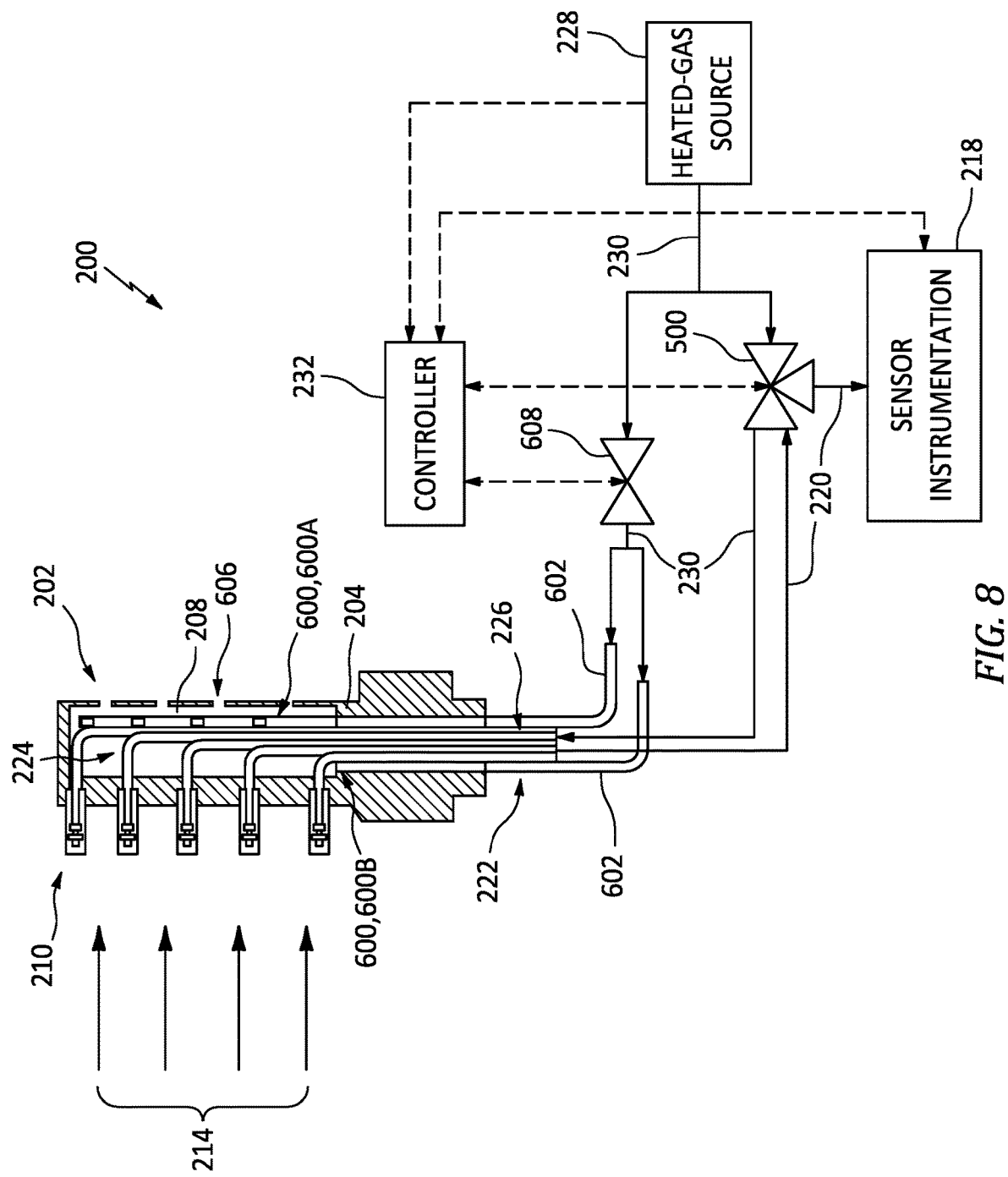
FIG. 8 illustrates a schematic view of another pressure measurement system including a pressure probe, in accordance with one or more embodiments of the present disclosure.

Referring to FIGS. 2, 6, and 8, the pressure measurement system 200 includes sensor instrumentation 218 in fluid communication with the plurality of sensor inlet ports 210. The sensor instrumentation 218 is configured to receive the sensed fluid flow (illustrated in FIGS. 5, 6, and 8 as sensed fluid flow 220) and to calculate one or more sensed fluid flow measurements such as, but not limited to, total pressure, static pressure, dynamic pressure, fluid flow velocity, fluid temperature, etc. As shown in FIGS. 5, 6, and 8, the sensor instrumentation 218 is located outside of the pressure probe 202 and may be located internal or external to the gas turbine engine 10.

The pressure measurement system 200 includes a plurality of probe conduits 222 fluidly connecting the plurality of sensor inlet ports 210 to the sensor instrumentation 218. For example, each probe conduit of the plurality of probe conduits 222 may be coupled to a respective sensor inlet port of the plurality of sensor inlet ports 210 and may extend from the respective sensor inlet port to an exterior of the probe body 204. As shown, for example, in FIG. 2, each probe conduit of the plurality of probe conduits 222 may include an internal conduit portion 224 located inside the probe body 204 and an external conduit portion 226 located outside the probe body 204 which connects the internal conduit portion 224 to one or more external components, such as the sensor instrumentation 218.

During operation of a gas turbine engine, such as the gas turbine engine 10, for operation, testing, etc., ice, water, sleet, and other liquids (e.g., oil, fuel, etc.) may accumulate on the pressure probe 202 as well as on and/or inside the plurality of sensor inlet ports 210, thereby impeding accurate measurement of fluid flow parameters with the pressure probe 202. Accordingly, the pressure probe 202 may require protection against icing and/or fluid ingestion in order to prevent or minimize a loss of fluid flow parameter measurement accuracy.

Referring to FIGS. 5-8, the pressure measurement system 200 may include a heated-gas source 228 in fluid communication with the pressure probe 202 and configured to supply a heated gas flow (illustrated in FIGS. 5-8 as heated gas flow 230) to the pressure probe 202. In various embodiments, for example, the heated-gas source 228 may be configured to supply heated gas 230 to each sensor inlet port of the plurality of sensor inlet ports 210 via respective probe conduits of the plurality of probe conduits 222 and/or to the interior of the probe body outside of and independent of the plurality of probe conduits 222. In various embodiments, the heated-gas source 228 may be a component of the gas turbine engine 10 which is configured to generate heated-gas as a byproduct of the normal operation of the component. For example, the heated-gas source 228 may be one of the compressors 38, 46 of the gas turbine engine 10, which may provide compressor bleed air to the pressure probe 202 as the heated gas 230. Where the pressure measurement system 200 is located in one of the compressors 38, 46 (see FIG. 1) or in proximity thereto, the length of the plurality of probe conduits 222 may be minimal. In various other embodiments, the heated-gas source 228 may be specifically configured to supply heated gas 230 to the pressure probe 202 and may be located internal or external to the gas turbine engine 10. For clarity, FIGS. 5 and 8 schematically illustrate exemplary flow paths of the sensed fluid flow 220 and the heated gas flow 230 for a single sensor inlet port of the plurality of sensor inlet ports 210, and the present disclosure will describe the flow paths of the sensed fluid flow 220 and the heated gas flow 230 for a single sensor inlet port. However, it should be understood that the other sensor inlet ports of the plurality of sensor inlet ports 210 may be configured similarly. Additionally, in FIGS. 5-8, portions of fluid conduits, such as the plurality of probe conduits 222, have been omitted to more clearly illustrate the flow paths for the sensed fluid flow 220 and the heated gas flow 230.

Referring to FIG. 5, in various embodiments, the pressure measurement system 200 may include at least one first valve 500 in fluid communication with the plurality of probe conduits 222. The at least one first valve 500 may be configured as a three-way valve as shown, for example, in FIG. 5. However, the present disclosure is not limited to this particular configuration of the at least one first valve 500. Each first valve of the at least one first valve 500 may be fluidly connected within the external conduit portion 226 of each respective probe conduit of the plurality of probe conduits 222 so as to control fluid flow between the pressure probe 202, the heated-gas source 228, and the sensor instrumentation 218. The at least one first valve 500 is operable between a sensing valve position and a heating valve position. In the sensing valve position, the at least one first valve 500 allows passage of the sensed fluid flow 220 through the probe conduit 222 from the sensor inlet port 210 to the sensor instrumentation 218 and prevents the passage of the heated gas flow 230 through the probe conduit 222 from the heated-gas source 228 to the sensor inlet port 210. In the heating valve position, the at least one first valve 500 allows passage of the heated gas flow 230 through the probe conduit 222 from the heated-gas source 228 to the sensor inlet port 210 and prevents the passage of the sensed fluid flow 220 through the probe conduit 222 from the sensor inlet port 210 to the sensor instrumentation 218.

In an exemplary operation of the pressure measurement system 200 shown in FIG. 5 and described above, the at least one first valve 500 may initially be positioned to the heating valve position to supply heated gas flow 230 to the sensor inlet port 210 from the heated-gas source 228. Application of the heated gas flow 230 to the sensor inlet port 210 may provide an "anti-icing" function by heating the sensor inlet port 210 and/or the probe body 204 sufficiently so that ice does not form on the sensor inlet port 210 and/or the probe body 204. Application of the heated gas flow 230 to the sensor inlet port 210 may additionally provide a "de-icing" function by heating the sensor inlet port 210 and/or the probe body 204 sufficiently so that any ice that has previously formed on the sensor inlet port 210 and/or the probe body 204 is melted. Further, the exhaust of the heated gas flow 230 from the sensor inlet port 210 may prevent or substantially reduce the ingestion of undesired fluids such as, but not limited to. water, fuel, and oil, into the sensor inlet port 210. This "anti-ingestion" feature of the pressure measurement system 200 may be especially useful where the pressure probe 202 is located in air/oil cavities of the gas turbine engine 10 where oil may otherwise be ingested into the sensor inlet port 210. In various embodiments, the heated-gas source 228 may be operated to control a flow rate and/or a temperature of the heated gas flow 230 supplied to the sensor inlet port 210. When it is necessary to measure fluid flow parameters with the pressure probe 202, the at least one first valve 500 may be repositioned to the sensing valve position, thereby cutting off the heated gas flow 230 to the sensor inlet port 210 and allowing the sensed fluid flow 220 from the fluid flow path 212 to be measured by the sensor instrumentation 218. Once measurement of the fluid flow parameters has been completed, the at least one first valve 500 may again be positioned to the heating valve position, thereby resuming the anti-icing, de-icing, and/or anti-ingestion functions of the pressure measurement system 200.

Figure 7:
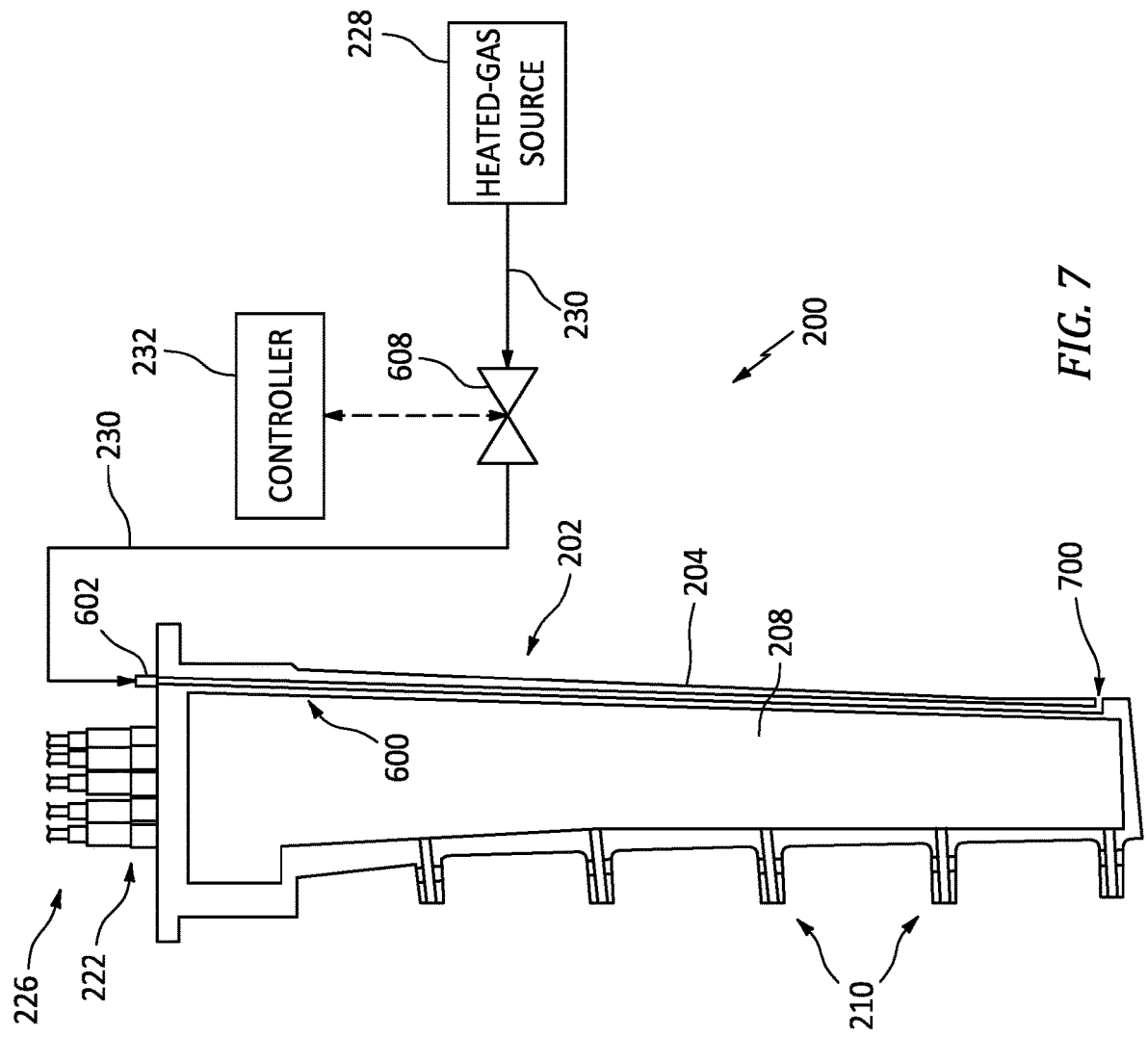
FIG. 7 illustrates a cross-sectional view of a pressure probe including a heating channel formed in a probe body of the pressure probe, in accordance with one or more embodiments of the present disclosure.

Referring to FIGS. 6-7, in various embodiments, the pressure probe 202 includes at least one heated-gas channel 600 located in the interior of the probe body 204 and in fluid communication with the heated-gas source 228. For example, the at least one heated-gas channel 600 may extend within the internal cavity 208 of the pressure probe 202 or may be formed within the probe body 204 itself. The at least one heated-gas channel 600 is independent of the plurality of probe conduits 222 used to convey the sensed fluid flow 220 to the sensor instrumentation 218. The heated gas flow 230 may be supplied to the at least one heated-gas channel 600 by at least one external conduit 602 in fluid communication between the heated-gas source 228 and the at least one heated-gas channel 600.

As shown in FIG. 6, in various embodiments, the at least one heated gas channel 600 may be located within the internal cavity 208 of the pressure probe 202 to provide the heated gas flow 230 to the internal cavity 208, thereby heating the probe body 204 and plurality of sensor inlet ports 210. In a first example of the at least one heated-gas channel 600 (indicated as heated-gas channel 600A in FIG. 6), the heated-gas channel 600A extends through a portion of internal cavity 208. The heated-gas channel 600A may extend substantially axially through the internal cavity 208 relative to the probe axis 206. In various embodiments, the heated-gas channel 600A may include a plurality of exit apertures 604 spaced (e.g., axially spaced) from one another along a length of the heated gas channel 600A within the internal cavity 208, in order to more equally distribute the heated gas flow 230 within the internal cavity 208. In a second example of the at least one heated-gas channel 600 (indicated as heated-gas channel 600B in FIG. 6), the heated-gas channel 600B is in fluid communication with the internal cavity 208 but may not substantially extend into the internal cavity 208. In various embodiments, the at least one heated-gas channel 600 may include a plurality of heated-gas channels which may be the same as or different from one another. For example, the at least one heated-gas channel 600 may include one or more of the exemplary heated-gas channel 600A and/or one or more of the exemplary heated-gas channel 600B. The present disclosure is not limited to the above-described exemplary configurations of the at least one heated-gas channel 600 and other suitable heated-gas channel configurations may be used based on the size, shape, and heating requirements of the particular respective pressure probe. In various embodiments, the probe body 204 may include at least one perforation 606 extending through the probe body 204 from the internal cavity 208 to the exterior of the probe body 204, thereby allowing the heated-gas flow 230 to exit the pressure probe 202.

As shown in FIG. 7, in various embodiments, the at least one heated-gas channel 600 may be located within and defined by the probe body 204. The at least one heated-gas channel 600 may be formed within the probe body 204 during formation of the probe body 204, for example, using an additive manufacturing process. Accordingly, the heated gas flow 230 may pass through the at least one heated-gas channel 600 within the probe body 204, thereby warming the probe body 204. The at least one heated-gas channel 600 may include at least one exit aperture 700 allowing the heated gas flow 230 to exit the at least one heated-gas channel 600. As shown in FIG. 7, the at least one exit aperture 700 may extend between the at least one heated-gas channel 600 and an exterior of the probe body 204. In various other embodiments, the at least one exit aperture 700 may extend between the at least one heated-gas channel 600 and the internal cavity 208 of the pressure probe 202. The heated gas flow 230 may then exit the pressure probe 202, for example, via the at least one perforation 606, as shown in FIG. 6. In various embodiments, the pressure probe 202 may include multiple configurations of the at least one heated-gas channel 600, such as the internally formed at least one heated-gas channel 600 of FIG. 7. in combination with the at least one heated-gas channel 600 configurations (e.g., heated-gas channel 600A, 600B) of FIG. 6.

As shown in FIGS. 6 and 7, the pressure measurement system 200 may include at least one second valve 608 in fluid communication with the at least one heated-gas channel 600. Each second valve of the at least one second valve 608 may be fluidly connected within the external conduit 602 so as to control fluid flow between the heated-gas source 228 and the at least one heated-gas channel 600. The at least one second valve 608 is operable between a heating valve position and a secured valve position. In the heating valve position, the at least one second valve 608 allows passage of the heated gas flow 230 through the external conduit 602 from the heated-gas source 228 to the at least one heated-gas channel 600. In the secured valve position, the at least one second valve 608 prevents passage of the heated gas flow 230 through the external conduit 602 from the heated-gas source 228 to the at least one heated-gas channel 600.

In an exemplary operation of the pressure measurement system 200 shown in FIGS. 6 and 7 and described above, the at least one second valve 608 may initially be positioned to the heating valve position to supply heated gas flow 230 to the at least one heated-gas channel 600 from the heated-gas source 228, thereby heating the probe body 204 and/or the plurality of sensor inlet ports 210. Accordingly, the heated gas flow 230 may provide anti-icing and de-icing functionality to the pressure probe 202. In comparison to the pressure measurement system 200 shown in FIG. 5 and described above, embodiments of the pressure measurement system 200 shown in FIGS. 6 and 7 do not supply the heated gas flow 230 to the plurality of sensor inlet ports 210 via the plurality of probe conduits 222 and, therefore, do not provide anti-ingestion functionality. However, the configuration of the FIGS. 6 and 7 embodiments of the pressure measurement system 200 may allow for the continuous application of the heated gas flow 230 to the pressure probe 202, and thereby the anti-icing and de-icing functionality, such as during measurement of the fluid flow parameters. By using independent fluid flow paths for the sensed fluid flow 220 and the heated gas flow 230, the sensed fluid flow 220 may be supplied to the sensor instrumentation 218 without securing the heated gas flow 230 to the pressure probe 202. In various embodiments, the heated-gas source 228 may be operated to control a flow rate and/or a temperature of the heated gas flow 230 supplied to the pressure probe 202.

Referring to FIG. 8, in various embodiments, the pressure measurement system 200 may include a combination of features discussed above with respect to embodiments of FIGS. 5-7. For example, as shown in FIG. 8, the pressure measurement system 200 may include the at least one first valve 500 configured to control the heated gas flow 230 from the heated-gas source 228 to the sensor inlet port 210 and the sensed fluid flow from the sensor inlet port 210 to the sensor instrumentation 218 as well as the at least one second valve 608 configured to control the heated gas flow 230 from the heated-gas source 228 to the at least one heated-gas channel 600 of the pressure probe 202.

Referring to FIGS. 5-8, the present disclosure pressure measurement system 200 may include a controller 232 in communication with one or more of the components (e.g., the at least one first valve 500, the at least one second valve 608, the heated-gas source 228, the sensor instrumentation 218, etc.) that may be present in the various embodiments of the present disclosure pressure measurement system 200. For example, the controller 232 may be configured to control the heated gas flow 230 from the heated-gas source 228 to the pressure probe 202. The controller 232 may be configured to execute stored instructions (e.g., algorithmic instructions) that cause the pressure measurement system 200 to perform steps or functions described herein. The controller 232 may include any type of computing device, computational circuit, or any type of process or processing circuit capable of executing a series of instructions that are stored in memory. The controller 232 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling the pressure measurement system 200 as described herein, and the stored instructions are not limited to any particular form (e.g., program files, system data, buffers, drivers, utilities, system programs, etc.) provided they can be executed by the controller 232. The controller 232 memory may be a non-transitory machine-readable storage medium configured to store instructions that when executed by one or more processors, cause the one or more processors to perform or cause the performance of certain functions. The memory may be a single memory device or a plurality of memory devices. The present disclosure controller 232 is not limited to any particular type of memory device. One skilled in the art will appreciate, based on a review of this disclosure, that the implementation of the controller 232 may be achieved via the use of hardware, software, firmware, or any combination thereof. Communications between pressure measurement system 200 components may be by wired connection or may be by wireless communication, or any combination thereof. Further, in various embodiments, the sensor instrumentation 218 may be included as part of the controller 232.

In various embodiments, the controller 232 may be configured to regulate (e.g., modulate) the heated-gas flow 230 to the pressure probe 202 to achieve a target temperature of the pressure probe 202. For example, the controller 232 may control the position of the at least one first valve 500, the position of the at least one second valve 608, and/or the flow rate and/or temperature of the heated gas flow 230 provided by the heated-gas source 228 to achieve the target temperature of the pressure probe 202. The target temperature for the pressure probe 202 may be determined, for example, based on one or both of a measured pressure (e.g., static pressure) or a measured temperature of the fluid in the fluid flow path 212, as calculated by the sensor instrumentation 218.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A measurement system for an aircraft gas turbine engine, the measurement system comprising:
   a probe comprising:
     a probe body extending lengthwise along a probe axis, the probe body defining an internal cavity of the probe;
     a plurality of sensor inlet ports extending through the probe body and configured to receive a sensed fluid flow, the plurality of sensor inlet ports axially spaced along the probe axis; and
     a plurality of probe conduits, each probe conduit of the plurality of probe conduits coupled to a respective sensor inlet port of the plurality of sensor inlet ports and extending from the respective sensor inlet port to an exterior of the probe body; and
   a heated-gas source in fluid communication with the probe and configured to supply a heated gas flow to one or both of:
     the plurality of sensor inlet ports via the plurality of probe conduits; and
     an interior of the probe body outside of the plurality of probe conduits.

2. The measurement system of claim 1, wherein each sensor inlet port of the plurality of sensor inlet ports faces a common fluid flow direction.

3. The measurement system of claim 1, further comprising sensor instrumentation in fluid communication with the plurality of sensor inlet ports via the plurality of probe conduits, the sensor instrumentation configured to receive the sensed fluid flow and calculate one or more sensed fluid flow measurements.

4. The measurement system of claim 3, further comprising at least one first valve in fluid communication with the plurality of probe conduits, the at least one first valve operable between a sensing valve position and a heating valve position, wherein:
the at least one first valve is configured to allow passage of the sensed fluid flow from the plurality of sensor inlet ports to the sensor instrumentation in the sensing valve position; and
the at least one first valve is configured to allow passage of the heated gas flow from the heated-gas source to the plurality of sensor inlet ports in the heating valve position.

5. The measurement system of claim 3, wherein the probe includes at least one heated-gas channel located in the interior of the probe body and in fluid communication with the heated-gas source.

6. The measurement system of claim 5, wherein the at least one heated-gas channel is located within the internal cavity of the probe.

7. The measurement system of claim 6, wherein the probe body includes at least one perforation extending through the probe body from the internal cavity to the exterior of the probe body.

8. The measurement system of claim 5, wherein the at least one heated-gas channel is located within and defined by the probe body.

9. The measurement system of claim 4, wherein the probe includes at least one heated-gas channel located in the interior of the probe body and in fluid communication with the heated-gas source via at least one second valve and independent of the at least one first valve.

10. The measurement system of claim 1, further comprising a controller configured to control the heated gas flow from the heated-gas source to the probe.

11. The measurement system of claim 10, wherein the controller is configured to regulate the heated gas flow to the probe, based on one or both of a measured pressure and a measured temperature of the sensed fluid flow, to achieve a target temperature of the probe.

12. The measurement system of claim 1, wherein each sensor inlet port of the plurality of sensor inlet ports comprises a Kiel probe or a Pitot probe.

13. A gas turbine engine for an aircraft, the gas turbine engine comprising:
a probe located within a fluid flow path of the gas turbine engine, the probe comprising:
a probe body extending lengthwise along a probe axis, the probe body defining an internal cavity of the probe;
a plurality of sensor inlet ports extending through the probe body and configured to receive a sensed fluid flow, the plurality of sensor inlet ports axially spaced along the probe axis; and
a plurality of probe conduits, each probe conduit of the plurality of probe conduits coupled to a respective sensor inlet port of the plurality of sensor inlet ports and extending from the respective sensor inlet port to an exterior of the probe body; and
a heated-gas source in fluid communication with the probe and configured to supply a heated gas flow to one or both of:
the plurality of sensor inlet ports via the plurality of probe conduits; and
an interior of the probe body outside of the plurality of probe conduits.

14. The gas turbine engine of claim 13, further comprising a duct defining the fluid flow path, wherein the probe is mounted to the duct within the fluid flow path.

15. The gas turbine engine of claim 13, further comprising a compressor, wherein the compressor defines the heated-gas source and supplies compressor bleed gas to the probe as the heated gas flow.

16. A method for operating a measurement system for an aircraft gas turbine engine, the method comprising:
receiving a sensed fluid flow with a plurality of sensor inlet ports extending through a probe body of a probe, the probe body defining an internal cavity of the probe; and
supplying a heated gas flow, with a heated-gas source in fluid communication with the probe, to one or both of:
the plurality of sensor inlet ports via a plurality of probe conduits, each probe conduit of the plurality of probe conduits coupled to a respective sensor inlet port of the plurality of sensor inlet ports and extending from the respective sensor inlet port to an exterior of the probe body; and
an interior of the probe body outside of the plurality of probe conduits.

17. The method of claim 16, wherein the step of receiving the sensed fluid flow with the plurality of sensor inlet ports includes receiving the sensed fluid flow with sensor instrumentation in fluid communication with the plurality of sensor inlet ports via the plurality of probe conduits and calculating one or more sensed fluid flow measurements with the sensor instrumentation.

18. The method of claim 17, further comprising operating at least one valve in fluid communication with the plurality of probe conduits between a sensing valve position and a heating valve position, operating the at least one valve including:
positioning the at least one valve in the sensing valve position during the step of receiving the sensed fluid flow with the plurality of sensor inlet ports to allow passage of the sensed fluid flow from the plurality of sensor inlet ports to the sensor instrumentation; and
positioning the at least one valve in the heating valve position during the step of supplying the heated gas flow to allow passage of the heated gas flow from the heated-gas source to the plurality of sensor inlet ports.

19. The method of claim 17, wherein the step of supplying the heated gas flow includes supplying the heated gas flow to at least one heated-gas channel located in the interior of the probe body with the heated-gas source.

20. The method of claim 17, further comprising regulating the heated gas flow to the probe, based on one or both of a measured pressure and a measure temperature of the sensed fluid flow, to achieve a target temperature of the probe.

* * * * *